United States Patent [19]

Lewis

[11] Patent Number: 4,800,526
[45] Date of Patent: Jan. 24, 1989

[54] MEMORY ELEMENT FOR INFORMATION STORAGE AND RETRIEVAL SYSTEM AND ASSOCIATED PROCESS

[75] Inventor: David F. Lewis, Monroe, Conn.

[73] Assignee: GAF Corporation, Wayne, N.J.

[21] Appl. No.: 47,350

[22] Filed: May 8, 1987

[51] Int. Cl.$^4$ .............................................. G11C 11/72
[52] U.S. Cl. .................................... 365/118; 365/128
[58] Field of Search ....................... 365/118, 128, 217

[56] References Cited

U.S. PATENT DOCUMENTS 4,065,308  12/1977  Bergen ................................ 365/126
4,090,253  5/1978   Salso ................................... 365/118

Primary Examiner—James W. Moffitt
Attorney, Agent, or Firm—Marilyn J. Maue; Joshua J. Ward

[57] ABSTRACT

A memory element for an electron beam target comprising an electrically insulating support laminated to a conductive layer which, in turn, is laminated to a dielectric surface layer having a thickness less than 1 micrometer, e.g. 0.04–0.8 micrometer, a resistivity of at least $10^{16}$ ohm-cm and a dielectric strength of at least $10^5$ volts/cm; said dielectric surface layer comprising a material sensitive to electron beam irradiation and provided, essentially coplanar with its exposed surface, with focusing means or indicia in the form of shaped patterns that provide reference points for locating recording or retrieval points during electron beam exposure and scanning of the target surface.

Writing is accomplished by irradiating with an electron beam either to develop a charge pattern or to alter the state of polymerization of cross-linking or both in a prescribed pattern for transmitting data. Where polymerization or cross-linking is involved, the material is altered such that subsequent contact with a solvent selectively removes the material in the state of lesser polymerization, leaving behind permanent islands of the unremoved material. By assigning a given logical meaning to the permanent islands or to the charge stored in the dielectric layer, for example, a dual character code is provided such that digital data can be stored. The focusing means or indicia allow addresses to be located in the memory element with sufficient precision that in excess of $10^8$ bits/cm$^2$ can be recorded and retrieved.

42 Claims, 2 Drawing Sheets

MEMORY ELEMENT FOR INFORMATION STORAGE AND RETRIEVAL SYSTEM AND ASSOCIATED PROCESS

BACKGROUND OF THE INVENTION

The present invention relates to binary data storage and retrieval and, more particularly, to a memory element for a system in which data is written and/or read by a scanning electron beam.

In the *Journal of Applied Physics*, Vol. 47, No. 5, May 1976, at page 1741, there appears an article entitled "Storage and examination of high-resolution charge images in Teflon foils" by J. Feder. The headnote to the article states that high-resolution charge patterns at various charge densities were written on Teflon TFE foils using a 10-kV electron beam with a ½ micrometer spot diameter and that resolutions of 50–100 line pairs/mm were observed by examination with an electron beam and use of xerographic development techniques. It concluded that charge spreading in the Teflon and the examination processes were factors limiting resolution and observed that development of stored patterns up to three months after their writing showed that resolutions of 100 line pairs can be maintained for this period.

According to the Feder article, "Teflon foils are capable of storing charges for time periods on the order of decades." The introduction suggests that "in addition to being of interest in xerography, the methods have possible application in the storage/retrieval of digital and pictorial information." However, no example deals with digital information. The object of the investigation the results of which are summarized in the article was to develop techniques for examining high-resolution charge patterns.

All charge patterns were written on 25 micrometer Teflon TFE (polytetrafluoroethyene) foils at Bell Laboratories using a Bell Laboratories Electron Beam Exposure System. The test pattern used consisted of 14 repetitions at different scales of a basic L configuration of lines of specific linewidth at various orientations, plus filled regions containing spaces of the particular linewidth. The linewidths ranged from 1 to 30 micrometers. The entire test pattern had a dimension of approximately 3.1×3.3 mm. Samples were prepared by stretching metalized foils of 25 micrometers Teflon TFE across chrome-coated 6.35-cm square glass plates with the metalized surface of the foil in contact with the chromed side of the glass.

The discussion of the results presented in the Feder article are of considerable interest. It is stated that both electron beam and electrophoretically examined patterns show a spreading of written areas. Moreover, it is stated that "images obtained in electron beam examination appeared somewhat fuzzy and defocussed (probably due to the low read beam energy) and were marred by background noise."

Speculating upon the causes for the limited resolution, the article observes that the electron beam machine used in the writing process provides a reasonably good ½ micrometer electron spot and is capable of repeated beam positioning within ½ micrometer in a specified focal plane. Based upon the 100 line pairs/mm resolutions that were achieved, the article estimates that a recording density of $10^{10}$ bits/m² ($10^6$ bits/cm²) was obtained, assuming a density of 1 bit per 10 micrometer square section of the Teflon.

SUMMARY OF THE INVENTION

With the foregoing as background, it is an object of the present invention to provide, for an information storage and retrieval system, a memory element capable of recording with a resolution equal to at least $10^8$ bits/cm².

It will be appreciated that to be able to write at such high density, the writing beam must be positionable and re-positionable with an accuracy in the neighborhood of about 0.1 micrometer, an accuracy significantly greater than that mentioned in the Feder article. Consequently, it is another object of the present invention to provide a memory element having means recognizable by an electron beam for providing spatial reference information to the beam control system for enabling beam positioning with the requisite precision.

Another requirement for precision in data location is sharp focusing of both the writing and reading electron beams. Therefore, a further object of the present invention is to provide a memory element that includes means for enabling beam focus adjustment with the required accuracy.

Yet another object of the present invention is to provide a memory element with the foregoing resolution capability and having sufficient permanence when written upon to provide archival retention of the underlying information. These and other objects of the invention will become apparent from the following description and disclosure.

In accordance with one aspect of the present invention there is provided a memory element for an information storage and retrieval system in which data is transferred by a scanning electron beam, wherein said element comprises an electrically conductive layer laminated to a layer of dielectric material, the latter having a thickness of less than 1 micrometer e.g. less than 0.5 micrometers, preferably not more than 0.35 micrometers, a resistivity of at least $10^{16}$ ohm-cm, and a dielectric strength of at least $10^5$ volts/cm, means disposed coplanar with the exposed surface of said dielectric material layer for providing focusing means or indicators for said electron beam, and means recognizable by said electron beam for providing spatial reference information to said system which enables precise repeatable access to discrete locations for each bit of information in said memory element, whereby said element is capable of handling data with a resolution equal to at least $10^8$ bits/cm². The above laminated conductive and dielectric layers can be and are usually supported by a smooth surfaced insulating substrate such as for example glass, ceramic or the like; which substrate has a thickness of from about 0.05 inch and about 0.15 inch.

In accordance with a further aspect of the present invention there is provided a method for storing digital data using a modulatable scanning electron beam, said method comprising in combination the steps of providing a memory element having an electrically conductive layer of a first electrically conductive substance to which is laminated a layer of electrically insulating material, the latter having a thickness of less than 1 micrometer, a resistivity of at least $10^{16}$ ohm-cm, a dielectric strength of at least $10^5$ volts/cm, and being a material subject to alteration of its state of polymerization and/or cross-linking when exposed to electron irradiation, scanning said electron beam over the exposed surface of said dielectric material while modulating said beam in accordance with the digital data to be stored for altering the state of polymerization and/or cross-linking in correspondence with the instantaneous value of said data within discrete selected areas of said dielectric material relative to the remaining areas of said dielectric material, subsequently treating said layer of dielectric material to create islands of said dielectric material by removing, as between said selected and remaining areas, said dielectric material having the lesser degree of polymerization and/or cross-linking, whereby the presence and absence of said islands represents the binary logical values of said data.

The dielectric surface layer of the present memory element can be composed of any material sensitive to electron beam irradiation which is capable of receiving and storing information transmitted. Accordingly, the dielectric layer can comprise a charge sensitive conjugated polyacetylene selected from those disclosed in my co-pending patent applications Ser. No. 773,487, filed Sept. 9, 1985, and Ser. No. 778,938, filed Sept. 23, 1985, now U.S. Pat. No. 4,705,742, a polymerizable and/or cross-linkable monomer, a cross-linkable polymer, a depolymerizable polymer or copolymer; which materials include styrene, tetrafluoroethylene, polymethylmethacrylate, poly(methylstyrene), polytetrafluoroethylene, polystyrene, poly(butene sulfone), the mixed half ester product of the reaction between hydroxyethylacrylate and hydroxyethylpyrrolidone with octadecyl vinyl ether-maleic anhydride copolymer.

Solvents employed for selective removal of exposed or unexposed portions of the dielectric layer are well known and include for example, methylene chloride, tetrahydrofuran, methylethyl ketone, methyl iso-butyl ketone and ethanol etc. and mixtures thereof. Generally, when irradiation exposure produces a polymerized and/or cross-linked polymer, the solvent removes unexposed portions; conversely, when irradiation exposure produces depolymerization of a polymer, the solvent removes the exposed portions of the dielectric material. Other materials such as diffusion pump oils, unsaturated long chain fatty acids or acid esters and the like can also be employed for the dielectric layer but are less desirable than those mentioned above.

BRIEF DESCRIPTION OF THE DRAWINGS

The invention will be better understood after reading the following detailed description of the presently preferred embodiments of the invention with reference to the appended drawings in which.

The same reference numerals are used throughout the drawings to designate the same or similar parts.

DETAILED DESCRIPTION OF THE PRESENTLY PREFERRED EMBODIMENTS

Figure 1:
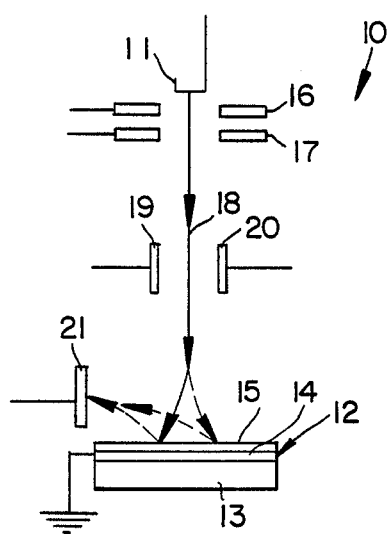
FIG. 1 is a schematic illustration of the principal components of an electron beam system for writing on or reading a memory element.

Referring to FIG. 1, there is shown schematically the principle components of an electron beam machine for writing and/or reading information on a body of dielectric material backed by a conductive member providing an electrical ground plane. The machine is designated generally by the reference numeral 10 and can be constructed essentially the same as a scanning electron beam microscope.

An electron source in the form of a cathode 11 is located within an evacuated chamber or enclosure (not shown). Facing the cathode 11 is its target, memory element 12, consisting of an insulating support or substrate 13 with an electrically conductive layer of material 14 on its surface facing the cathode 11, and with the surface of layer 14 that is remote from substrate 13 supporting a dielectric layer 15 that is laminated thereto. As shown, the conductive layer 14 is grounded in any convenient manner.

Electrodes 16 and 17 are provided for accelerating the electrons emitted by cathode 11 toward the target 12 and for focusing the thus created beam 18 on the target surface. Next, suitable beam deflecting components such as electrodes 19 and 20 are provided to deflect the beam 18 for scanning the desired area of target 12. Finally, some form of output electrode such as electrode 21 is provided to collect any secondary electrons leaving the target 12. If the machine 10 is used for reading, suitable correlation equipment (not shown) will relate the secondary emission current obtained at any instant by the output electrode, here electrode 21, to the beam impingement site on the target inferred from the beam acceleration and deflection parameters, and from the information provided by features of the present invention to be described.

Figure 2:
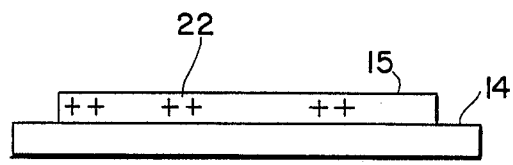
FIG. 2 is a diagrammatic view of a memory element constructed in accordance with the invention and useful as an aid to explaining the system operation.

One recording method that can be used with the memory elements to be described relies upon developing a charge pattern within the layer 15. As shown in FIG. 2, if a site within the dielectric layer 15 is bombarded by an electron beam with suitable energy to cause more secondary electrons to leave than the quantity entering and being retained therein, a net positive charge will be created at such site. Therefore, if the electron beam 18 is turned on and off or modulated in correspondence with digital "ones" and "zeros", the particular digital data represented by the "on" condition of beam 18 will be represented in the dielectric layer by a positively charged site such as that at 22. If the target area is scanned in accordance with some suitable pattern, such as for example a checkerboard fashion, each separately addressable location such as a "box" of the checkerboard can be caused to contain either a positively charged site or a site free of such charge, all in correspondence with the digital information recorded. When it is desired to read the recorded information, the target can be "developed" through application of a xerographic toner and then read by any suitable means. Obviously, it is possible to adjust the energy of the electron beam so as to cause less secondary electrons to leave dielectric layer 15 than the quantity entering and thereby produce negatively charged sites rather than positive sites, if such is desired.

Figure 6:
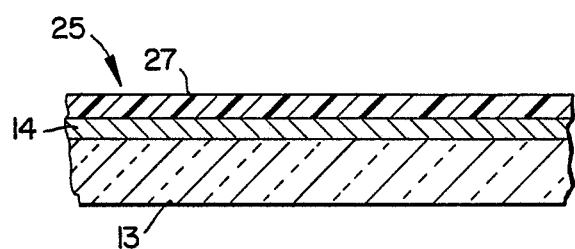
FIG. 6 is a cross-sectional view of a memory element showing the construction thereof.
Figure 7:
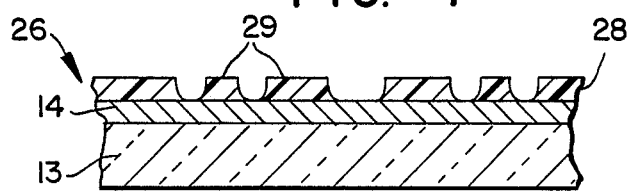
FIG. 7 is a view similar to FIG. 6, but showing a memory element whose surface has been permanently altered to produce an archival type element.

Another recording method is illustrated schematically in FIGS. 6 and 7. Here, the memory element is designated generally by the numerals 25 and 26 in FIGS. 6 and 7, respectively, representing the element before and after information is recorded therein. The substrate layer 13 and conductive layer 14 can be the same as that described for target 12 in FIGS. 1 and 2. However, the layer of dielectric material 27 applied to the surface of conductive layer 14 is chosen as one that can have its state of polymerization and/or cross-linking altered by the action of a focused particle beam.

The requirements for the layer 27 are that it have a thickness less than 1 micrometer, and preferably no thicker than the diameter of the data cells which contain the recorded information. For example, to record with a density of $4 \times 10^8$ bits/cm$^2$ the layer 27 is preferably no more than 0.5 micrometers thick. In any event, it is necessary that the layer 27 be thin enough to allow complete penetration of the exposing radiation therethrough.

When certain of the materials mentioned herein are exposed to electron beam irradiation, cross-linking or polymerization of the polymer or monomer is initiated in known manner wherever the beam penetrates. Such alteration of the material at the irradiated site renders the material at the site insoluble in a particular solvent or otherwise distinguishable from the unexposed areas. With other materials, depolymerization occurs when irradiated and these irradiated portions are removed by solvent. Consequently, after the memory element has been written upon, the dielectric surface can be developed by application of the appropriate solvent to leave islands of that portion of the material that/ has a greater degree of polymerization. Each island can represent either a logical one or a logical zero depending upon the prevailing logic assignment. A cross-section of a developed layer is represented by the layer 28 in FIG. 7.

The developed layer can be ready by locating the memory element 26 at the target position in the machine of FIG. 1, for example. The secondary emission derived from the islands 29 (see FIG. 7) will be distinguishable from that derived from the intervening valleys where the layer 14 is exposed to the scanning electron beam. Alternatively, the developed memory element can be read by aid of any other suitable device.

The thickness requirements mentioned above when describing the embodiment shown in FIGS. 6 and 7 are also applicable to the charge image recording method described with reference to FIG. 2. Additionally, and applicable to both memory element types, the operative dielectric layer 15 or 27 should preferably have a resistivity of at least $10^{16}$ ohm-cm and a dielectric strength of at least $10^5$ volts/cm. Using known plasma deposition processes it is possible to deposit films of suitable dielectric material with thicknesses ranging down to the neighborhood of 0.04 micrometer. Very thin coatings can also be obtained with certain materials using a solvent/spin-coating technique. For example, mono disperse polystyrene dissolved in xylene is satisfactorily handled with a spin coating technique.

It was mentioned above that an object of the invention is to be able to record with a resolution equal to at least $10^8$ bits/cm$^2$. Actually, the invention enables attaining resolutions better than $10^9$ bits/cm$^2$, which corresponds to a single bit cell having a diameter of approximately 0.316 micrometers. Experimental results suggest that the limiting factor is the ability to produce a smooth, uniform, pinhole free layer, 15 or 27, having the requisite thinness. A layer 0.25 micrometers thick, for example, can resolve $1.6 \times 10^9$ bits/cm$^2$.

However, with the data cells so closely spaced in the memory element, it is no longer possible to rely upon a knowledge of the deflection signals acting on the electron beam as a way of directing the beam to impinge upon a selected point or cell. The normal beam positioning precision is subject to an error that is likely to be at least a significant fraction of the cell size and can even exceed the cell size. To overcome this problem and provide for repeatability in addressing selected points on the memory element, resort can be had to the novel memory element construction and to the process of using the same that will now be described.

Figure 3:
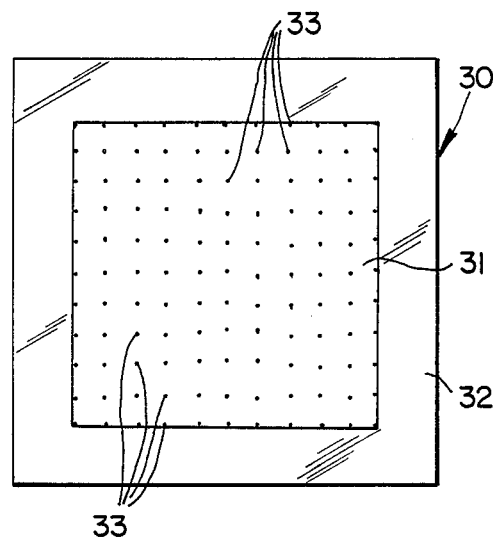
FIG. 3 is a top plan view of a memory element embodying the present invention.

Referring to FIG. 3, a plan view is presented of a memory element 30, the supporting substrate and conductive layer of which, although not shown, is the same as that described with reference to FIGS. 1, 2, 6 and 7. The central area 31 is the upper surface of a dielectric layer similar to either layer 15 or 27 previously described. The useful area or field is bounded by a marginal region 32 of electrically conductive material, such as a metal or metal oxide e.g., aluminum, chromium, indium-tin oxide, etc. Located throughout the field 31, following a regular and precisely laid out repetitive geometric relationship or pattern, are a plurality of indicia means (indicated in FIG. 3 by the dots 33) recognizable by the electron beam for providing spatial reference information to the beam operating system for enabling precise repeatable access to discrete locations for each bit of information either to be recorded or previously recorded within the area 31. It is presently preferred to lay out the means 33 in a regular geometric pattern, e.g., as illustrated in FIG. 3.

Figure 4:
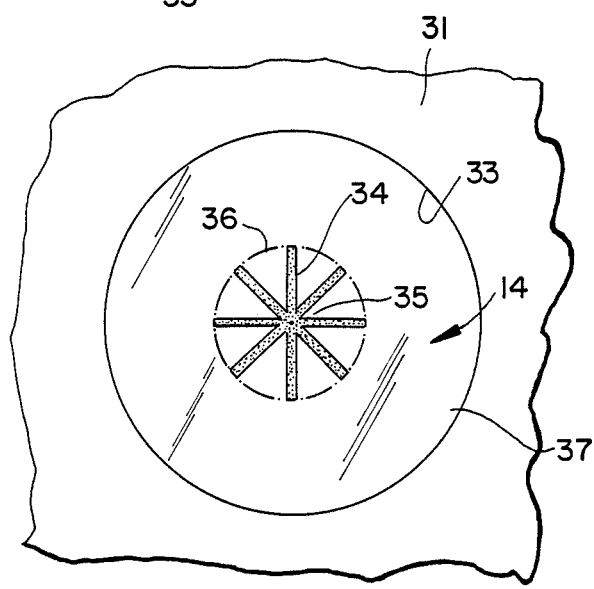
FIG. 4 is a fragmentary enlargement of a small area of the surface of the element of FIG. 3 showing details in the construction of the latter.

Each dot 33 in FIG. 3 contains a marker shown greatly enlarged in FIG. 4, as in the form of an asterisk-like pattern 34 of a distinguishable material such as gold or other suitable metal having a secondary electron emission distinctive from that of the conductive layer. The indicia are laminated directly to the surface of the conductive layer 14 within an area 37, here shown as circular, that is free of the dielectric material 31.

It should be understood that other indicia configurations such as for example bars, squares and the like as well as other metals such as for example platinum, silver, etc., can be employed to facilitate the electron beam orientation desired.

In order to appreciate what has been accomplished it is worthwhile to consider an example. The dimensions of the area 31 are 1 cm $\times$ 1 cm. Each marker 33 has its exact center 35 (see FIG. 4) spaced 1 mm from the adjacent markers in both of the orthogonally related directions so as to mark the corners of a square 1 mm on a side. It is intended that information will be recorded within each square millimeter of space at a density of $4 \times 10^6$ bits/mm$^2$. The diameter of the insulation-free area 37 of the marker 33 is approximately 25 micrometers, while the diameter of the circle (this is an imaginary circle shown by the phantom outline 36) circumscribing the extremities of the pattern 34 is about 10 micrometers.

When the system is in operation the indicia or markers 33 provide indicators of precise known location on a relative basis, that is, relative to the associated memory element, which indicia not only serve as address signposts, but provide a clearly distinguishable subject that can be used sharply to focus the beam at its point of convergence at the surface of memory element 30. Thus, the beam can be scanned until a change in response is detected. This occurs when one of the marker patterns 34 is encountered. Then a series of short orthogonally related sweeps are undertaken across the pattern 34 and the responses are compared. When these responses are equal, the beam cross section will be circular and of correct size indicating proper focusing.

In general, the marker, such as the pattern 34, must be readily distinguishable from the background. Both the pattern 34 (the mark) and the background (the dielectric free area 37 of the layer 14) should be electrically conductive. However, the mark and background should differ significantly in secondary electron emission coefficient.

In order to better understand the constructional requirements, a few examples describing the fabrication of memory elements will be described.

EXAMPLE I

A piece of Corning 7059 borosilicate glass measuring 24.5×25.4×1.27 mm was cleaned by boiling for 30 minutes in filtered (0.22 micrometer filter) 10 megohm water containing 0.1% detergent. Without allowing the glass substrate to dry, it was rinsed thoroughly in clean water and dried by immersion in a hot isopropanol vapor bath. A coating, approximately 0.1 micrometer thick, of chromium was vacuum-evaporated onto one surface of the substrate.

Next, the chromium coated substrate was mounted in a first electrode positioned opposite a 6" Rogowski electrode, all within a Faraday cage within a vacuum chamber. The chamber was evacuated and continuously pumped while a discharge potential of approximately 1500V. AC was applied between the two electrodes. The chamber pressure was maintained below 5 torr while tetrafluoroethylene monomer, after passing through a cold trap to remove any limonene inhibitor, was admitted at a constant flow rate and a partial pressure of 600 torr. Molecules of polymer were deposited on the chromium surface producing a dielectric polymer layer that grew at the approximate rare of 161 angstroms/minute. After 30 minutes, a layer was obtained having a thickness slightly less than 0.5 micrometers.

After the dielectric layer was deposited, a number of small scratches were made near the perimeter to insure electrical contact with the chromium layer, and a layer of chromium was applied by evaporative techniques to form a conductive border about 5 mm wide around the perimeter of the dielectric layer. This metallic layer was produced with a thickness of about 0.075 micrometers and left a central recording area of about 15×15 mm.

Experimental focusing indicators, represented as grids or patterns, were prepared by taking a section of circular standard 1000 mesh copper specimen grid, having a diameter of 3 mm, and using the section as a template. A thin film of Victawet, about 250 angstroms thick, was vacuum evaporated onto the surface of the copper template. Victawet is an organic surface active parting agent. Next, a layer of gold about 750 angstroms thick was vacuum evaporated onto the Victawet surface. When the composite structure was immersed in water, the gold layer separated from the template and was then transferred in a drop of water to the surface of the chromium border strip. Upon removing the water drop with a syringe, the gold grid flattened and conformed to the underlying surface. Several such gold grids were applied to the perimeter strip.

The memory element produced as above was rested in a scanning electron microscope and it was found that a readable electrostatic charge pattern could be written and stored on the dielectric layer. The gold grids provided a definite discernable image on which the electron beam was focused, and was also successfully used to verify the mechanical alignment of the memory element relative to the electron optical axis within ±1 mil.

The Corning glass substrate was chosen because it is both flat and smooth. However, smoothness is the critical factor while flatness depends upon the electron beam geometry. There is no reason why the memory element could not be located on a cylindrical surface, for example. Surface examination of the glass substrate has revealed that the maximum surface step was less than 150 angstroms in height.

EXAMPLE II

Memory elements were constructed following the steps described in Example I, except that the discharge potential was lowered to 600V. AC., all other conditions remaining substantially the same, and a satisfactory component was produced. The growth rate was less, however, being 102 angstroms/minute.

EXAMPLE III

Same conditions as Example I, except the partial pressure of the monomer gas was lowered to 300 torr., and Argon gas was added to bring the total pressure back to 600 torr, all other conditions remaining the same. The growth rate was 124 angstroms/minute and a satisfactory element resulted.

EXAMPLE IV

The procedure of Example I was repeated under the conditions specified in the following tabulation with the indicated results.

| Partial pressure of TFE (torr) | 300 | 300 | 1000 |
|---|---|---|---|
| Total pressure with Argon added (torr) | 1000 | 1000 | 1000 |
| Discharge Potential (volts) | 600 | 1500 | 600 |
| Growth Rate (angstroms/minute) | 47 | 101 | 25 |

EXAMPLE V

A chromium coated glass substrate was prepared as described in Example I and then coated with a delectric layer by spin coating an 11% solution in toluene of a mixed half ester product of the reaction of hydroxyethylacrylate and hydroxyethylpyrrolidone with an decyl vinyl ether-maleic anhydride copolymer. The solution was filtered through a 0.2 micrometer filter and applied to a disc spinning at 5000-7000 r.p.m. The conditions were adjusted to obtain a coating layer no thicker than 0.25 micrometers. The structure was then provided with a conductive border of chromium and focusing grids as described in Example I. The resulting element was thereafter exposed in an electron beam machine and then "developed" by removing the unpolymerized or non-cross-linked areas with methylene chloride filtered through a 0.22 micrometer filter. A satisfactory permanent record was obtained at a density of approximately $1.6 \times 10^9$ bits/cm$^2$.

Using the process of Example V, satisfactory elements can be obtained by substituting for the specified mixed half ester product any of a number of known resist materials used for lithography as applied to integrated circuit technology or the like. The only requirement is that it be possible to produce a coating layer having a thickness preferably no greater than 0.25 micrometers and that the material will experience cross-linking or polymerization when exposed to electron beam radiation such that selective removal occurs when a suitable solvent as known in the art is applied.

EXAMPLE VI

Useful memory elements can be produced with conjugated polyacetylenes, particularly di- and triacetylenes, and polyolefins employing the Langmuir-Blodgett technique of thin film production. The selected compounds are simultaneously both hydrophobic and hydrophilic permitting them to be spread on the surface of a body of water. If the metal coated substrate is dipped in the liquid it will pick up on its surface a layer of the organic material of molecular thickness. Repeated dipping will result in material build-up After 20 to 30 dips it is possible to develop a layer up to about 0.05 micrometers in thickness. Such layer can be written upon with an electron beam which causes polymerization with some cross-linking. Acetylenes and olefins, thus treated, can be developed with any suitable solvent such as tetrahydrofuran, ethyl acetate, or methyl ethyl ketone.

EXAMPLE VII

While the procedure outlined in Example I for providing the focusing and reference marks was satisfactory, a preferred process will now be described.

First, layers of two conductive materials in the form of thin films are sequentially produced by coating on the borosilicate substrate. For example a layer of gold on top of a layer of chromium. Over this metal coated substrate is applied a layer of photosensitive resist material, for example, a positive resist, although a negative resist could also be used. The resist is then exposed to irradiation to selectively depolymerize or otherwise condition for selective removal. After developing to remove the irradiated regions, the assembly is subjected to a plasma etch to remove those areas of the outermost conductive areas that were exposed by the development step. The remaining resist is then stripped away with, e.g. chromic acid; although other known stripping techniques and the stripping materials or a plasma etch can be used to remove resist. After stripping, a layer of the dielectric recording material is applied over the conductive layers. This is followed by a barrier layer and another photosensitive resist layer.

A large window is now opened in the last mentioned resist layer by exposing the area above the patterned conductive layers. The unmasked barrier layer over the conductive layers is now removed by a suitable etch. When the assembly is subjected to an oxygen or air plasma etch, the circular pattern is transferred through the dielectric layer down to the pattern in the conductive layer. The organic photosensitive resist is also removed by this last mentioned step. Finally, the barrier layer is removed to leave the finished recording medium.

The memory elements that have been described above are capable of very high density recording, on the order of $10^9$ bits/cm$^2$ or higher. However, particularly with the non-permanent recording using a charge pattern, high resolution reading thereof is limited if reliance is had on the use of xerographic techniques. Best results can be obtained using an electron beam device such as that shown in FIG. 5 to which attention should now be directed.

Starting with a cathode 40, an electron beam 41 is accelerated and focused by electrodes 42 and 43 through a magnetic field at 44 that exists normal to the paper, and that bends the beam path toward the axis between the deflection elements, such as electrodes 45 and 46. Assuming neutral deflection field, the beam 41 will follow the path 47 toward the center of the target or memory element 12. Immediately prior to arriving at the target 12, the beam 41 passes through a decelerating electric field provided by an electrode assembly 59. When data is being written on the memory element, it is presently preferred that the potential of electrode 59 be adjusted so that the beam impinges the target 12 at a potential corresponding to the maximum secondary electron emission coefficient of the dielectric layer 15. This procedure permits the rate of charge accumulation to be maximized. Since for most dielectric materials the maximum secondary electron emission coefficient is much greater than 1.0, the number of secondary electrons leaving the dielectric layer 15 will exceed the number of primary electrons impinging the dielectric layer and the latter will accumulate a net positive charge.

Figure 5:
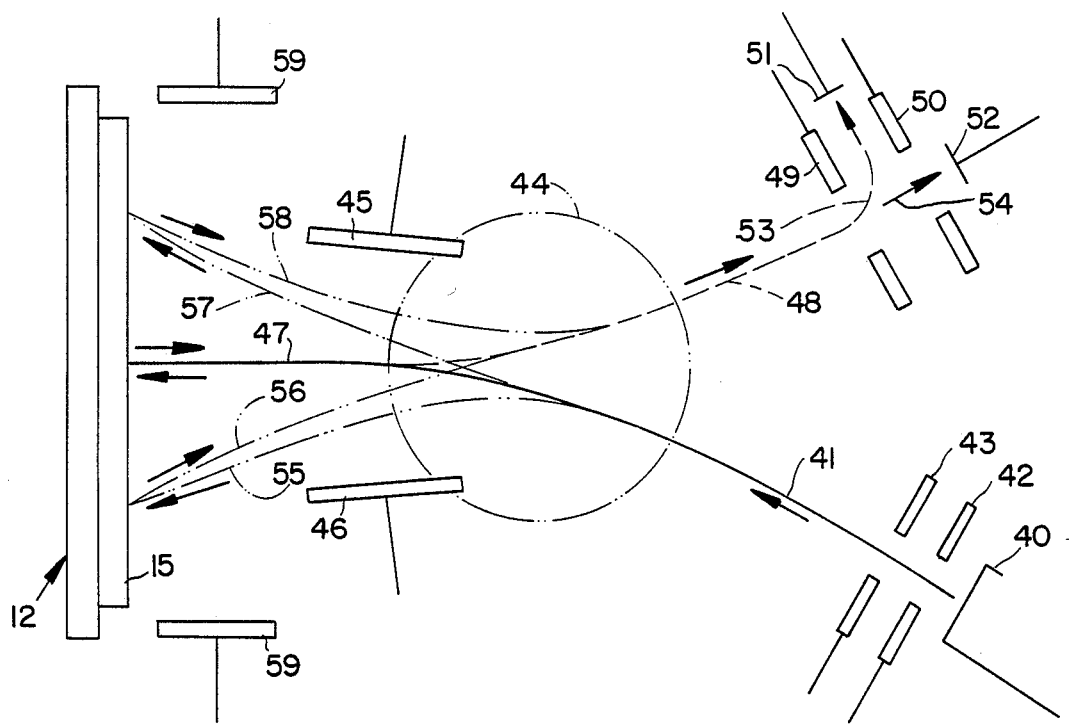
FIG. 5 is a schematic illustration of an electron beam reading and/or writing system representing a modification of the system of FIG. 1.

When the apparatus of FIG. 5 is being used for reading a charge pattern previously produced on target 12, the potential of electrode 59 is adjusted so that the beam impinges the target 12 at a potential corresponding to a secondary electron emission coefficient as close to 1.0 as possible. In this manner the theoretical net accumulation of charge during readout is caused to be zero thereby rendering the readout process non-destructive. In either mode of operation, the beam potential should be such as to cause secondary electrons to leave the dielectric layer 15, and these electrons will leave with a potential that is a function of the pre-existing charge in the layer 15 at the point of beam impingement. The exiting secondary electrons are then accelerated in the reverse direction back along path 47 to be deflected by the magnetic field 44 to follow path 48 toward electrodes 49, 50, 51 and 52. By proper adjustment of the potentials applied to electrodes 49 and 50 those secondary electrons emitted from areas of dielectric layer 15 that were positively charged will, because of lower potential (lower velocity), be decelerated and caused to follow path 53 to be collected by the output electrode 51 that is connected to suitable electron multiplier and amplification components (not shown) for useful detection. Only those secondary electrons originating at uncharged or negatively charged regions will have sufficient potential (higher velocity) to follow path 54 to the second output electrode 52 that is connected to its own suitable electron multiplier and amplification components (not shown) for useful detection. Application of suitable voltage to the electrodes 45 and 46 will cause deflection of both the outgoing and return electron beams across the surface of target 12 between the limits shown symbolically by the lines 55, 56, 57 and 58. It is to be understood that the drawing is limited to a two-dimensional representation but that the electrodes 45 and 46 will have counterparts, not shown, for developing beam deflection in directions normal to the paper.

Having described the invention with regard to the presently preferred embodiments thereof, it should be understood that various changes in construction can be introduced without departing from the true spirit of the invention as defined in the appended claims.

What is claimed is:

1. A memory element for an information storage and retrieval system in which data is transferred by a scanning electron beam, wherein said element comprises an electrically conductive layer of an electrically conductive substance to which is laminated a layer of dielectric material, the latter having a thickness of less than 1 micrometer, a resistivity of at least $10^{16}$ ohm-cm, and a dielectric strength of at least $10^5$ volts/cm, means disposed essentially coplanar with the exposed surface of said insulating material layer for providing a focusing means for said electron beam, and means recognizable by said electron beam for providing spatial reference information to said system for enabling precise repeatable access to discrete locations for each bit of information in said memory element, whereby said element is capable of handling data with a resolution equal to at least $10^8$ bits/cm$^2$.

2. A memory element according to claim 1, wherein the same means provides both said focusing means and said means for providing spatial reference information.

3. A memory element according to claim 2, wherein said focusing means and spatial reference means comprise a plurality of precisely spaced indicia of a material having a secondary electron emission characteristic when exposed to said electron beam that differs from that of said electrically conductive substance.

4. A memory element according to claim 3, wherein indicia have an asterisk-like configuration.

5. A memory element according to claim 4, wherein said conductive substance comprises a first electrically conductive substance and said indicia each comprise a body of a second electrically conductive substance different from said first conductive substance and laminated directly to said electrically conductive layer within areas free of said dielectric material.

6. A memory element according to claim 5, wherein said first and second electrically conductive substances comprise chromium and gold, respectively.

7. A memory element according to claim 6, wherein said indicia are located throughout the useful area of the memory element in a repetitive geometric relationship.

8. A memory element according to claim 6 wherein said indicia are located on a conductive support which borders the dielectric layer around its peripheral edge.

9. A memory element according to claim 7, wherein said geometric relationship is defined by a rectangular grid with the individual indicia located at the respective intersections of said grid.

10. A memory element according to claim 9, wherein said indicia are located on centers that are not more than 1 mm apart.

11. A memory element according to claim 10, wherein the diameter of an imaginary circle circumscribing the extremities of each said indicia is not more than about 10 micrometers.

12. A memory element according to claim 11, wherein said electrically conductive layer is laminated, in turn, to a rigid body of boro-silicate glass having a thickness of ar least about 0.05 inches.

13. A memory element according to claim 12, wherein said dielectric material is selected from the group consisting of styrene monomer, polystyrene, polyacetylenes, polymethyl methacrylate, half esters of 1:1 copolymers of vinyl ethers and maleic anhydride, tetrafluoroethylene, polytetrafluoroethylene, plasma polymerized tetrafluoroethylene, plasma polymerized ethylene, plasma polymerized mixtures of tetrafluoroethylene and ethylene, silicon dioxide, titanium oxide, magnesium oxide, poly(methylstyrene), poly(butene sulfone) and the mixed half ester product of the reaction of hydroxyethylacrylate and hydroxyethylpyrrolidone with an octadecyl vinyl ether-maleic anhydride copolymer.

14. The memory element according to claim 13 wherein said dielectric material is selected from the group consisting of a polymer, a polymerizable monomer and a depolymerizable polymer and is subject to alteration of its state of polymerization when exposed to electron irradiation.

15. A memory element according to claim 3, said indicia each comprise a body of a second electrically conductive substance different from said first conductive substance and laminated directly to said electrically conductive substance within areas free of said dielectric material.

16. A memory element according to claim 15, wherein said first and second electrically conductive substances comprise chromium and gold, respectively.

17. A memory element according to claim 15, wherein said indicia are located throughout the recording area of the memory element in a repetitive geometric relationship.

18. A memory element according to claim 17, wherein said geometric relationship is defined by a rectangular grid with the individual indicia located at the respective intersections of said grid.

19. A memory element according to claim 18, wherein said patterns are located on centers that are no more than 1 mm apart.

20. A memory element according to claim 15, wherein the diameter of an imaginary circle circumscribing the extremities of each said pattern is no more than about 10 micrometers.

21. A memory element according to claim 20, wherein indicia have an asterisk-like configuration.

22. A memory element according to claim 1, wherein said dielectric material is subject to alteration of its state of polymerization when exposed to electron irradiation.

23. A memory element according to claim 22, wherein the same means provides both said focusing means and said means for providing spatial reference information.

24. A memory element according to claim 23, wherein said focusing means and spatial reference means comprise a plurality of precisely spaced indicia of a material having a secondary electron emission characteristic when exposed to said electron beam that differs from that of said first conductive substance.

25. A memory element according to claim 24, wherein indicia have an asterisk-like configuration.

26. A memory element according to claim 1, wherein said layer of dielectric material has a thickness less than 0.5 micrometer.

27. A memory element according to claim 26, wherein said layer of dielectric material has a thickness of not more than 0.35 micrometer.

28. A memory element according to claim 22, wherein said dielectric material is subject to polymerization when exposed to electron irradiation.

29. A memory element according to claim 22, wherein said dielectric material is subject to de-polymerization when exposed to electron irradiation.

30. A method for storing digital data using a modulatable scanning electron beam, said method comprising in combination the steps of providing a memory element having an electrically conductive layer of an electrically conductive substance to which is laminated a layer of dielectric material, the latter having a thickness of less than 1 micrometer, a resistivity of at least $10^{16}$ ohm-cm, a dielectric strength of at least $10^5$ volts/cm, and being a material subject to alteration of its surface properties when exposed to electron irradiation, such alteration resulting from selective polymerization and/or cross-linking, or selective depolymerization, of a monomer or polymer, scanning said electron beam over the exposed surface of said dielectric material while modulating said beam in accordance with the digital data to be stored for altering the surface properties of the dielectric material in correspondence with the instantaneous value of said data within discrete selected areas of said dielectric material relative to remaining unaltered areas of said dielectric material, subsequently treating said layer of dielectric material to create islands of said dielectric material by removing, as between said selected and remaining areas, said dielectric material having a lesser degree of polymerization and/or cross-linking, whereby the presence and absence of said islands represents the binary logical values of said data.

31. A method according to claim 30, further comprising the steps of providing reference indicia and a focusing means on said memory element, and using said focusing means and reference indicia to focus said electron beam on the surface of said layer of dielectric material and to locate said discrete selected areas within said memory element for either altering the surface properties of the located area or reading the presence or absence of an island of material at said located area.

32. A method according to claim 30, wherein said dielectric material undergoes polymerization when exposed to electron irradiation, and said islands are formed from said dielectric material that has been polymerized by said scanning of said modulated beam.

33. A method according to claim 30, wherein said dielectric material undergoes depolymerization when exposed to electron irradiation, and said islands are formed from said dielectric material that remains after removing depolymerized areas of said dielectric material.

34. A memory element for an information retrieval system in which data is ready by a scanning electron beam, wherein said element comprises an electrically conductive layer of an electrically conductive substance to which is laminated dielectric material having altered surface areas the presence or absence of said altered areas representing the binary logical values of transmitted data, such alteration resulting from charged and uncharged areas or from selective areas of a higher degree of polymerization than existed in the unexposed dielectric material, said dielectric material having a maximum thickness of less than 1 micrometer, a resistivity of at least $10^{16}$ ohm/cm, and a dielectric strength of at least $10^5$ volts/cm, means disposed essentially coplanar with the exposed upper surface of said dielectric material for providing focusing means for said electron beam, and means recognizable by said electron beam for providing spatial reference information to said system for enabling precise repeatable access to the discrete locations of dielectric surface alteration for enabling reading of data present with a density of at least $10^8$ bits/cm$^2$.

35. A memory element according to claim 34, wherein the same means provides both said focusing means and said means for providing spatial reference information.

36. A memory element according to claim 34, wherein the dielectric material which is laminated to said electrically conductive layer is in the form of an array of islands and the presence or absence of said islands represents the binary logical values of transmitted data and wherein said islands provide said focusing means for said electron beam and spacial reference information to said system by enabling precise repeatable access to discrete locations of said islands.

37. A memory element according to claim 35, wherein said electrically conductive layer is composed of a first electrically conductive material, said focusing and spatial reference means comprises a plurality of precisely spaced indicia of a second electrically conductive material having a secondary electron emission characteristic when exposed to said electron beam that differs from that of said first conductive material.

38. A memory element according to claim 37 wherein indicia have an asterisk-like configuration.

39. A memory element according to claim 34 wherein the dielectric material containing the recorded transmitted data is surrounded around its periphery electrically conductive border and composed of an electrically conductive material having a secondary electron emission significantly distinguishable from said electrically conductive border when exposed to said electron beam irradiation.

40. The memory element according to claim 39 wherein the electrically conductive layer and the electrically conductive border are composed of the same material.

41. The memory element according to claim 43 wherein said indicia are formed of a metal foil of gold, platinum or copper.

42. The memory element of claim 41 wherein said electrically conductive border material is chromium and said indicia have asterisk-like shapes and are composed of gold.

* * * * *